United States Patent
Bernhoff et al.

(10) Patent No.: US 7,355,293 B2
(45) Date of Patent: Apr. 8, 2008

(54) WAVE POWER ASSEMBLY WITH AN ELECTROMAGNETIC DAMPNING MEANS

(75) Inventors: Hans Bernhoff, Uppsala (SE); Mats Leijon, Uppsala (SE)

(73) Assignee: Seabased AB, Uppsala (SE)

( * ) Notice: Subject to any disclaimer, the term of this patent is extended or adjusted under 35 U.S.C. 154(b) by 118 days.

(21) Appl. No.: 10/552,329

(22) PCT Filed: Apr. 13, 2004

(86) PCT No.: PCT/SE2004/000576

§ 371 (c)(1),
(2), (4) Date: Oct. 7, 2005

(87) PCT Pub. No.: WO2004/090324

PCT Pub. Date: Oct. 21, 2004

(65) Prior Publication Data

US 2007/0040384 A1    Feb. 22, 2007

(30) Foreign Application Priority Data

Apr. 14, 2003   (SE) .................................. 0301106

(51) Int. Cl.
*F03B 13/10* (2006.01)
*F03B 13/12* (2006.01)
*H02P 9/04* (2006.01)

(52) U.S. Cl. ......................................... 290/42; 290/53
(58) Field of Classification Search ................... 290/53, 290/42; 415/7; 60/498; 417/332
See application file for complete search history.

(56) References Cited

U.S. PATENT DOCUMENTS

| | | | | |
|---|---|---|---|---|
| 4,539,485 A | * | 9/1985 | Neuenschwander | 290/53 |
| 4,912,746 A | * | 3/1990 | Oishi | 310/12 |
| 5,654,602 A | * | 8/1997 | Willyoung | 310/179 |
| 6,020,653 A | * | 2/2000 | Woodbridge et al. | 290/53 |
| 6,392,314 B1 | * | 5/2002 | Dick | 290/53 |
| 6,515,375 B1 | * | 2/2003 | Beal | 290/42 |
| 6,617,705 B1 | * | 9/2003 | Smalser et al. | 290/42 |
| 6,791,214 B2 | * | 9/2004 | Korenaga | 310/12 |
| 6,849,969 B2 | * | 2/2005 | Kang et al. | 310/12 |
| 6,894,416 B1 | * | 5/2005 | Leijon et al. | 310/196 |
| 7,164,212 B2 | * | 1/2007 | Leijon et al. | 290/42 |

FOREIGN PATENT DOCUMENTS

| | | | | |
|---|---|---|---|---|
| GB | 2272026 A | * | 5/1994 | |
| JP | 02311160 A | * | 12/1990 | |
| WO | WO 0106119 | | 1/2001 | |

* cited by examiner

*Primary Examiner*—Julio Gonzalez
(74) *Attorney, Agent, or Firm*—The Maxham Firm

(57) ABSTRACT

A wave power assembly comprising a hull and a linear electric generator. The rotor is connected to the hull and the stator is arranged to be anchored at a sea/lake bottom. The generator is provided with an electromagnetic damping means in order to keep the pulsations of the axial force exerted by the stator on the rotor at a relatively low level, which damping means comprises geometric arrangement adapted herefor of at least some one of the stator winding, the stator slots and the rotor magnets. The invention also relates to a wave power plant built up from wave power assemblies according to the invention. Furthermore, the invention relates to a use of the wave power assembly and a method for generation of electric energy.

23 Claims, 4 Drawing Sheets

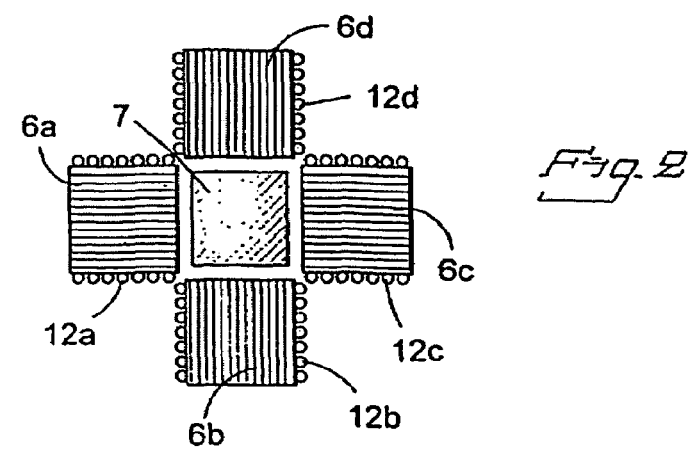
*Fig. 2*
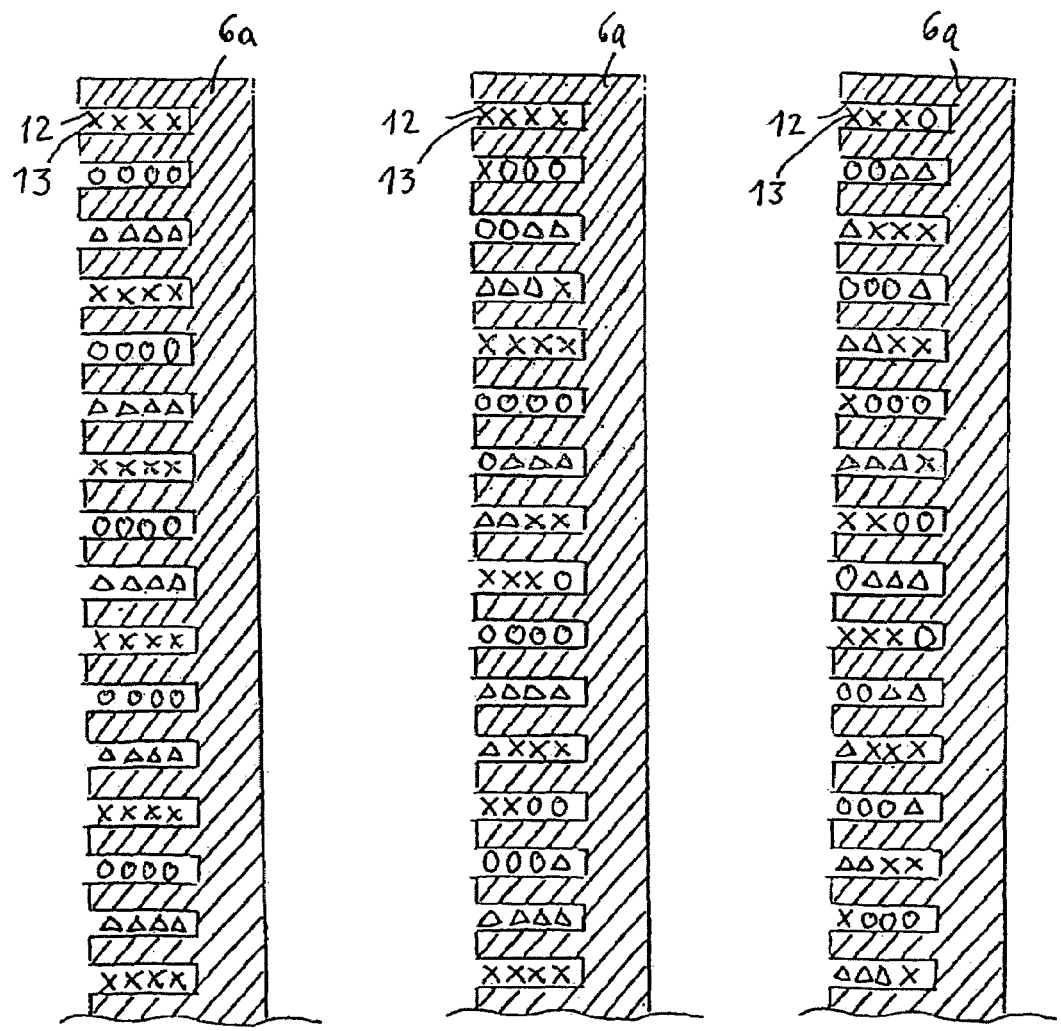
*Fig. 3*  *Fig. 4*  *Fig. 5*

WAVE POWER ASSEMBLY WITH AN ELECTROMAGNETIC DAMPNING MEANS

FIELD OF THE INVENTION

The present invention relates in a first aspect to a wave power assembly, comprising a hull and a linear electric generator, the rotor of which by means of connection means is connected to the hull and the stator of which is arranged to be anchored at a sea/lake bottom.

In a second aspect the invention relates to a wave power plant comprising a plurality of wave power assemblies according to the invention.

In a third aspect, the invention relates to the use of the invented wave power assembly in order to produce electric current.

In a fourth aspect, the invention relates to a method for the generation of electric energy.

In the present application, the term rotor is used for the movable part of the linear generator. Thus, it should be appreciated that the term rotor does not relate to a rotary body but a linearly reciprocating body. Thus, by the direction of motion of the rotor, reference is made to the linear direction of motion thereof.

The wave power assembly according to the invention is primarily intended for but not limited to applications up to 500 kW.

The fact that the stator is arranged for anchorage at the bottom of the sea does not necessarily imply that it is situated on the same. Neither that it has to be stiffly connected to the bottom of the sea. Thus, the stator construction may naturally be floatingly supported and the anchorage may only consist of a line or the like, which prevents the assembly to drive away.

BACKGROUND OF THE INVENTION

Wave motions in the sea and large lakes are a potential energy source which till now is very little utilized. The available wave energy depends on the wave height and is naturally different for different locations. The average wave energy during a year is dependent on the different wind conditions, which are highly influenced by the distance of the location from the nearest coast. Measurements have, among other things, been made in the North Sea. At a measuring point approx. 100 km to the west of the coast of Jutland where the depth was approx. 50 m, measurings of the wave height have been made.

In order to utilize the energy that is available by the motions of the sea waves, different types of wave power assemblies for the generation of electric power have been proposed. However, these have not succeeded to successfully compete with conventional electric power production. Wave power plants realized hitherto have in the main been test plants or used for local energy supply to navigation buoys. In order for commercial electricity production to be feasible, and thereby give access to the large energy reserve available in the motions of the sea waves, it is not only required that the setting out of the assemblies is carried out in suitably located places. It is also necessary that the assembly is reliable, has high efficiency as well as low manufacturing and operating costs.

Among the feasible principles of the conversion of the wave motion energy to electric energy, a linear generator should in that connection to the largest extent meet these requirements.

The vertical motions of the hull caused by the wave motions can thereby directly be transferred to a reciprocating motion of the rotor of the generator. A linear generator may be made very robust and simple and by it being anchored at the bottom, it becomes solidly unaffectable by streams in the water. The only movable part of the generator will be the reciprocating rotor. By the few movable parts thereof and the simple constructive build-up thereof, the assembly becomes very reliable.

By, for instance, U.S. Pat. No. 6,020,653, a wave power assembly is previously known, which is based on the linear generator principle. Hence, the specification describes a generator anchored at the bottom, which generator produces electric energy from the wave motions of the sea surface. A generator coil is connected to a hull so that the coil moves up and down with the wave motions. A magnetic field acts on the coil when it moves so that an electromagnetic force is generated in the same. The magnetic field is such that it provides a uniform field having a single magnetic orientation along the length of stroke of the entire coil. The generator comprises a base plate on the bottom of the sea that carries the magnetic core in which the coil moves.

Furthermore, a wave power assembly provided with a linear electric generator is previously known by U.S. Pat. No. 4,539,485. The rotor thereof consists of a number of permanent magnets and the winding of the generator is arranged in the surrounding stator.

Further, in PCT/SE02/02405, a wave power assembly is disclosed having a linear generator in which the rotor is permanent magnetic and the stator comprises winding forming a plurality of poles distributed in the direction of motion of the rotor. A spring means is arranged in the form of a tension spring and exerts a downwardly directed tensile force on the rotor, i.e. directed against the lifting force of the hull.

In a wave power assembly of the type that the invention relates to, the rotor is subjected to axial forces. Said forces are pulsating and thereby lead to an uneven running and create disturbances. The object of the present invention is to reduce the same disturbances.

SUMMARY OF THE INVENTION

The object set-up has been attained, according to the invention, by a wave power assembly of the kind defined in the preamble of claim 1 comprising the special features that the generator is provided with an electromechanic damping means in order to keep the pulsations of the axial force exerted by the stator on the rotor on a relatively low level, which damping means comprises geometrical arrangement adapted herefor of at least some one of the stator winding, the stator slots and the rotor magnets.

The invention is based on an analysis of the causes for the mentioned disturbances. This has led up to the understanding that the causes to a significant part can be derived to the electromagnetic transformation of energy and the courses of the axial magnetic forces that the stator in that connection exerts on the rotor. As a consequence of the magnets on the rotor passing past the windings of the stator, said forces will pulsate depending on the position of the respective magnetic pole in relation to a stator slot. This insight constitutes the basis for the measures that, according to the invention, are taken in order to overcome the disturbances. By the fact that the generator is provided with means for keeping said pulsations at a relatively low level, the total axial force on the rotor will become much more even than otherwise, which results in more even and more undisturbed running.

The means for this is related to the geometry of the components vital for the electromechanic transformation of energy. Thus, by geometrically arranging the stator winding, the stator slots and the rotor magnets so that pulsating axial force occurring on the respective rotor magnet co-operates contra-cyclically with each other and is leveled out over time, it is attained that the resulting magnetic axial force on the rotor becomes more even during the course of motion, the desired reduction of the disturbances being obtained.

As should be clear from the description above, the term "damping means" should not be understood so that the means has the direct function of damping already developed pulsations but rather to prevent that the pulsations become so large as they would be in conventional arrangements of winding, slots and magnets.

The result will be that the risk of mechanical problems of the generator is reduced. Furthermore, the electromagnetic transformation of energy will be more favourable in that it becomes more even and having a higher efficiency.

According to a preferred embodiment of the invented wave power assembly, the stator comprises multiphase winding, and the electromagnetic damping means consists of the stator winding comprising fractional slot winding. Fractional slot winding is a well-tried construction for rotary electric generators and constitutes a simple and expedient way to, by means of the winding geometry, reduce the axial force pulsations.

According to an additional preferred embodiment, the fractional slot winding has a winding factor that is <1. The advantage of such an embodiment is that it facilitates having less distance between the poles.

According to an alternative preferred embodiment, the fractional slot winding has a winding factor that is >1. This is especially favourable in slow-running machines, which is normally the case in assemblies of the type to which the invention relates.

According to an additional advantageous embodiment, the stator is composed of a plurality of stator packs distributed evenly around the rotor, with each stator pack having a winding that comprises fractional slot winding. Thereby, it is made possible to utilize as large a part as possible of the magnetic field for the induction, and for maximal evenness it is then suitable that all the stator packs are fractional slot winded.

According to an additional preferred embodiment, the electromagnetic damping means comprises that at least some of the poles of the rotor and/or some of the winding slots of the stator are oriented obliquely in relation to a plane perpendicular to the direction of motion of the rotor.

By the poles and/or winding slots being obliquely oriented, it is attained that a pole passes a winding gradually. Thereby, the magnetic force will correspondingly get a gradually increasing and decreasing strength with a less strong pulsation as a consequence.

According to a preferred embodiment, each pole comprises a magnet of an elongate shape having a longitudinal axis that forms an angle to a plane perpendicular to the direction of motion of the rotor.

According to an alternative preferred embodiment, each pole comprises a group of a plurality of magnets, which are axially displaced in relation to each other.

The two embodiments closest above enables a structurally simple way to solely by means of modification of the rotor provide the inclination, wherein the stator can be formed in a conventional way.

According to an additional preferred embodiment, the winding slots form an angle to a plane perpendicular to the direction of motion of the rotor. By means of this embodiment, the rotor can be formed in a conventional way.

The embodiments above may naturally be combined so that the generator has an asymmetric alignment of the magnets as well as the winding slots, if so at different inclinations. It may also be combined with fractional slot winding.

According to an additional preferred embodiment, the rotor is permanent magnetic, which constitutes a simple and expedient embodiment.

The above-mentioned preferred embodiments of the invented wave power assembly are defined in the claims depending on claim 1.

In the second, third and fourth aspects of the invention, the object set-up has been attained by a wave power plant comprising a plurality of wave power assemblies according to the invention, by the use of a wave power plant according to the invention in order to produce electric current, and by a method for production of electric current being carried out by means of a wave power assembly according to the invention, respectively, which are defined in claims 12, 13 and 14, respectively.

By the invented wave power assembly, the invented use and the invented method, advantages of the corresponding type are gained as in the invented wave power assembly and the preferred embodiments of the same and that have been accounted for above.

The invention is explained closer by the appended detailed description of advantageous embodiment examples of the same, reference being made to the appended drawing figures.

BRIEF DESCRIPTION OF THE DRAWINGS

FIG. 1 is a schematic side view of a known wave power assembly of the type that the invention relates to.

FIG. 2 is a section along the line II-II in FIG. 1.

FIG. 3 is a schematic part section through a stator pack according to prior art.

FIG. 4 is a corresponding section according to a first advantageous embodiment example according to the invention.

FIG. 5 is a corresponding section according to a second advantageous embodiment example according to the invention.

DESCRIPTION OF ADVANTAGEOUS EMBODIMENT EXAMPLES

Figure 1:
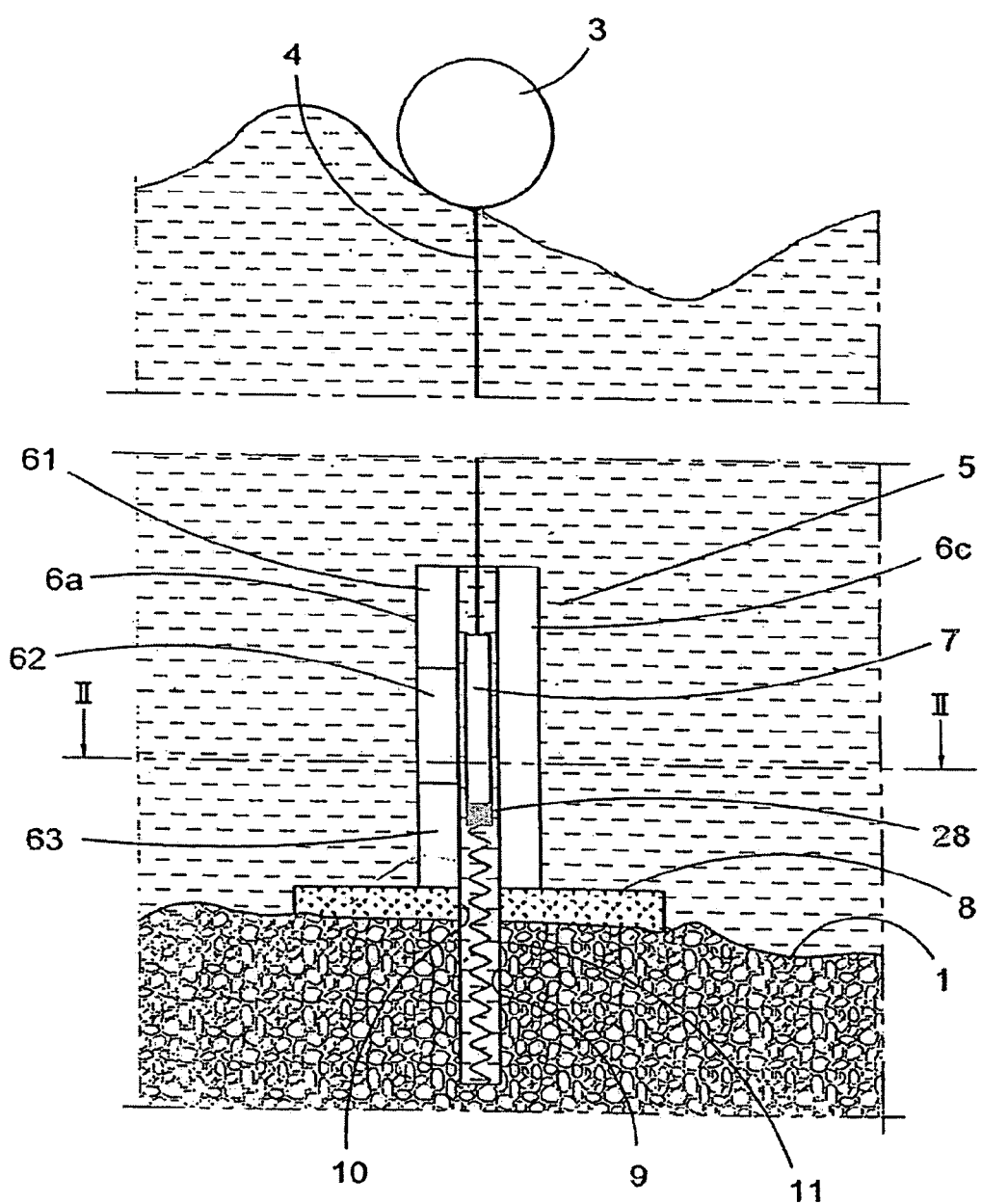

FIG. 1 illustrates the principle of a wave power assembly according to the invention. A hull 3 is arranged to float on the sea surface 2. Waves impart reciprocating vertical motion to the hull 3. At the bottom 1, a linear generator 5 is anchored via a base plate 8 fastened at the bottom, which plate may be a concrete slab. At the base plate 8, the stator 6a, 6c of the linear generator is fastened. The stator consists of four vertical column-like stator packs, only two of which are visible in the figure. In the space between the stator packs, the rotor 7 of the generator is arranged. The same is connected to the hull 3 by means of a line 4. The rotor 7 is of permanent magnetic material.

The base plate 8 has a centrally arranged hole 10, and concentrically therewith a bottom hole 9 is recessed in the bottom of the sea. The bottom hole 9 may suitably be lined. At the lower end of the bottom hole 9, a tension spring 11 is fastened, which with the other end thereof is fastened at the lower end of the rotor 7. The hole 10 in the base plate 8 and the bottom hole 9 have a diameter allowing the rotor 7 to move freely through the same.

Each stator pack 6a, 6c is composed of a number of modules. In the example shown, it is marked on the stator pack 6a how the same is divided into three vertically distributed modules 61, 62, 63.

When the hull 3 by the wave motions on the sea surface 2 moves up and down, this motion is transferred Via the line 4 to the rotor 7, which receives a corresponding reciprocating motion between the stator packs. Thereby, current is generated in the stator windings. The bottom hole 9 allows the rotor to pass the entire stator in the downward motion thereof. The tension spring 11 gives an additional force to the downward motion so that the line 4 at every instant is kept stretched.

The spring may also be formed so that it in certain situations also can exert an upwardly directed force. By means of a control means 28, the spring constant of the spring may be adjusted so that resonance is attained during as large a part of the time as possible.

In order to be able to resist salt water, the stator is entirely or partly impregnated by VP or silicone.

FIG. 2 is a section along the line II-II in FIG. 1. In this example, the rotor 7 has a square cross-section and a stator pack 6a-6d is arranged at each side of the rotor 7. The winding of the respective stator pack is indicated by 12a-12d. In the figure, the orientation of the sheet-metal plates in each stator pack is also seen. The air gap between the rotor and adjacent stator packs is in the order of some mm.

Each stator pack comprises fractional slot winding, i.e. the winding factor is not an integer.

The winding factor, $$q = \frac{Q}{MP},$$

where Q is the number of slots, M the number of phases and P the number of poles. Thus, the fractional slot winding represents that Q#MPn, where also n is an integer. This in contrast to conventional winding where Q=MPn. Fractional slot winding is a generally known embodiment as regards rotary electric machines.

In FIG. 3, as back ground illustration a stator 6a in a linear generator is illustrated with the winding 13 being integer-slot winding for 3-phase.

Each slot 12 contains 4 turns of a winding and the different phases are indicated by different symbols. In this case, q is an integer. Thus, FIG. 3 represents prior art.

FIG. 4 shows, in a corresponding section, an embodiment example according to the invention. Also here, it is a matter of 3-phase, indicated correspondingly as in FIG. 3. Here, the winding 13 has a winding factor that is greater than 1, a so-called pitch extension.

FIG. 5 shows correspondingly an embodiment example at 3-phase with the winding factor of the winding 13 being smaller than 1, a so-called pitch reduction.

Figure 6:
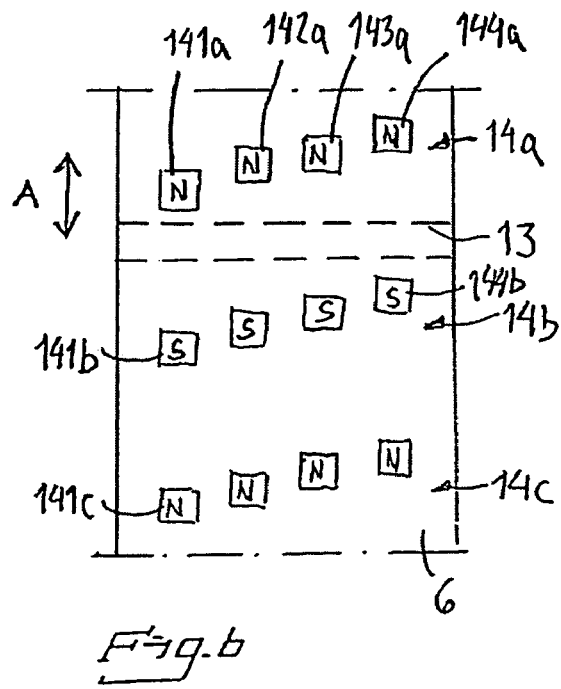
FIG. 6 is a part of a side view of a rotor according to a third advantageous embodiment example according to the invention.

FIG. 6 is a part of a side view of one of the sides of a square rotor 7 according to an embodiment example of the invention. The direction of motion of the rotor is indicated by the arrow A. Each pole 14a, 14b, 14c consists of a plurality of permanent magnets 141a-144a. The magnets 141a-144a of a pole are somewhat displaced in the axial direction in relation to each other on a line forming a small angle to a plane perpendicular to the direction of motion A of the rotor. The magnets in the figure are on a straight line, but it may alternatively have another curve shape. The lowermost magnet 141a of the pole 14a is situated at a certain distance from the uppermost magnet 144b in the half-pole 14b being closest below. Suitably, said distance corresponds to a half half-pole pitch or less.

The surface of the rotor 7 shown in the figure co-operates with a stator pack located above the plane of the figure and having winding slots facing the rotor 7. One of the winding slots 13 of the stator pack is indicated by dashed lines in the figure. When the rotor 7 moves downwards in the figure, the magnet 141a of the first pole 14a will pass past the winding slot 13 and induce current in the winding thereof, wherein as a consequence thereof an upwardly directed force will act on the rotor 7. Then, with some delay, the adjacent magnet 142a will pass the winding slot with the corresponding course of events and then the magnets 143a and 144a. The axial force on the rotor 7 will, in that connection, be distributed in time in comparison with if the magnets 141a-144a of the pole 14a had been oriented in a conventional way, parallel to the winding slot 13. Thereby, the axial force becomes less strongly pulsating.

Figure 7:
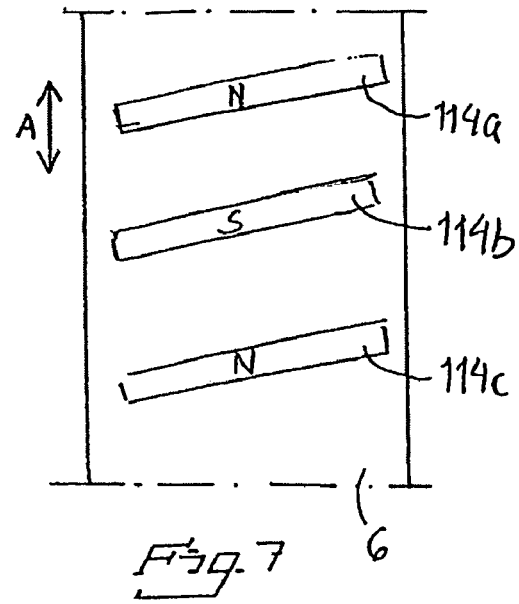
FIG. 7 is a corresponding view of a fourth advantageous embodiment example.

FIG. 7 is a view corresponding to the one in FIG. 6 of an alternative embodiment example. In this case, each pole 14a-14c consists of a single magnet that is elongate and runs obliquely, correspondingly to the line connecting the magnets of the respective pole in FIG. 6.

Figure 8:
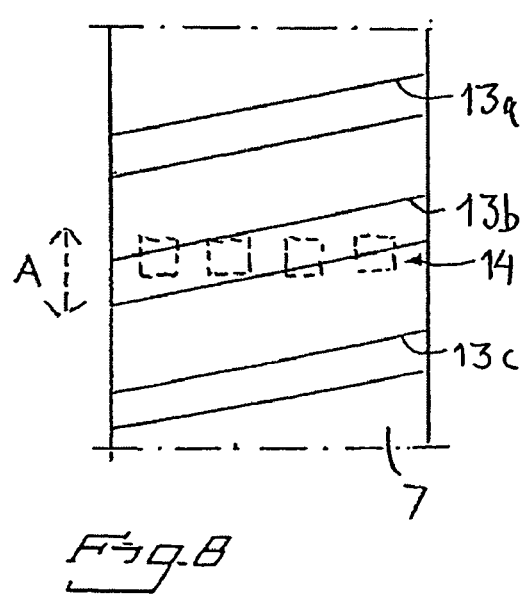
FIG. 8 is a part of a side view of a stator pack according to a fifth advantageous embodiment example.

FIG. 8 is a part of a side view of a stator pack 6, and shows the side that is intended to be directed against the rotor. The winding slots 13a-13c of the stator pack 6 form a small angle to a plane perpendicular to the direction of motion A of the rotor. The rotor located above the plane of the figure, with one of the poles thereof having been indicated by dashed lines, will thereby gradually pass a stator slot 13b. In that connection, a corresponding course of events is obtained as the one that is described in connection with FIG. 6.

Figure 9:
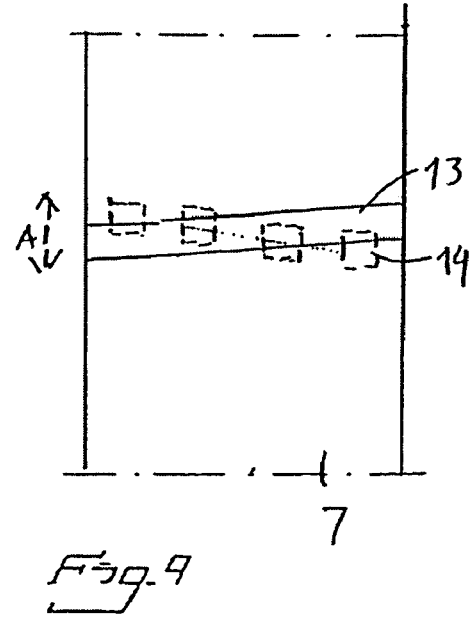
FIG. 9 is a corresponding side view of a sixth advantageous embodiment example.

FIG. 9 is a view corresponding to the one in FIG. 9 and illustrates an example with the winding slots 13 as well as the poles 14 being inclined, but in different directions and at smaller inclination than in the other examples.

Figure 10:
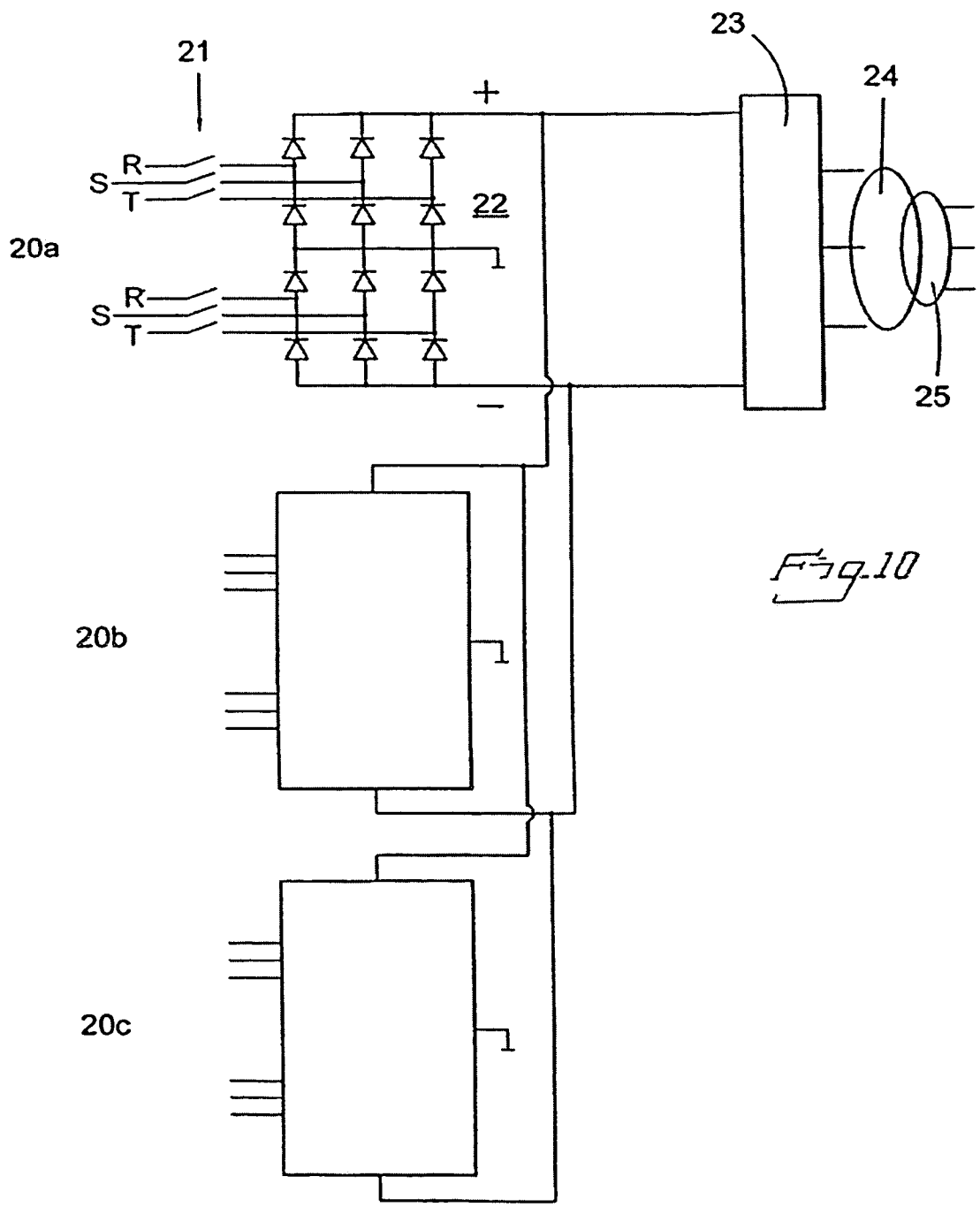
FIG. 10 is a diagram illustrating the connection of a plurality of assemblies according to the invention into a wave power plant.

A wave power plant according to the invention consists of two or more assemblies of the above-described kind. In FIG. 10, it is illustrated how these are connected in order to deliver energy to a mains. In the example shown, the power plant consists of three assemblies symbolically indicated by 20a-20c. Each assembly is, via a breaker or contactor 21 and a rectifier 22, connected to an inverter 23, in a bipolar circuit according to the figure. In the figure, a circuit diagram is drawn only for the assembly 20a. It should be appreciated that the other assemblies 20b, 20c are correspondingly connected. The inverter 23 delivers three-phase current to the mains 25, possibly via a transformer 24 and/or a filter. The rectifiers may be diodes that may be gate-controlled and of the type IGBT, GTO or tyristor, comprise gate-controlled bipolar components or be uncontrolled.

The voltages on the DC side may be connected in parallel, connected in series or a combination of both.

The invention claimed is:

1. A wave power assembly comprising;
a hull;
a linear electric generator having a rotor and a stator, the rotor being configured with magnets and being connected to said hull, said stator having slots and windings and being adapted to be anchored to a sea/lake bottom; and
electromagnetic damping means, said damping means being configured to maintain at a relatively low level the pulsations of the axial force exerted by said stator on said rotor, said damping means comprising a geometric configuration of at least one of said stator windings in said stator slots, and said rotor magnets.

2. The wave power assembly according to claim 1, wherein said stator comprises multiphase winding, and said electromagnetic damping means comprises said stator winding configured as a fractional slot winding.

3. The wave power assembly according to claim 2, wherein said stator comprises a 3-phase winding.

4. The wave power assembly according to claim 2, wherein said fractional slot winding has a winding factor that is greater than one.

5. The wave power assembly according to claim 3, wherein said fractional slot winding has a winding factor that is greater than one.

6. The wave power assembly according to claim 2, wherein said fractional slot winding has a winding factor that is less than one.

7. The wave power assembly according to claim 3, wherein said fractional slot winding has a winding factor that is less than one.

8. The wave power assembly according to claim 1, wherein said stator comprises a plurality of stator packs evenly distributed around said rotor, each said stator pack having a winding that comprises a fractional slot winding.

9. The wave power assembly according to claim 1, wherein said magnets are configured as a plurality of magnetic poles, said electromagnetic damping means is so configured that at least some of said poles of said rotor, or some of said winding slots of said stator, or both, are oriented obliquely in relation to a plane perpendicular to the direction of motion of said rotor.

10. The wave power assembly according to claim 2, wherein said magnets are configured as a plurality of magnetic poles, said electromagnetic damping means is so configured that at least some of said poles of said rotor, or some of said winding slots of said stator, or both, are oriented obliquely in relation to a plane perpendicular to the direction of motion of said rotor.

11. The wave power assembly according to claim 8, wherein said magnets are configured as a plurality of magnetic poles, said electromagnetic damping means is so configured that at least some of said poles of said rotor, or some of said winding slots of said stator, or both, are oriented obliquely in relation to a plane perpendicular to the direction of motion of said rotor.

12. The wave power assembly according to claim 9, wherein said magnetic poles comprise magnets of an elongate shape having a longitudinal axis that forms an angle to a plane perpendicular to the direction of motion of said rotor.

13. The wave power assembly according to claim 10, wherein said magnetic poles comprise magnets of an elongate shape having a longitudinal axis that forms an angle to a plane perpendicular to the direction of motion of said rotor.

14. The wave power assembly according to claim 11, wherein said magnetic poles comprise magnets of an elongate shape having a longitudinal axis that forms an angle to a plane perpendicular to the direction of motion of said rotor.

15. The wave power assembly according to claim 9, wherein each of said magnetic poles comprises a group of a plurality of magnets, said magnets being axially displaced in relation to each other.

16. The wave power assembly according to claim 12, wherein each of said magnetic poles comprises a group of a plurality of magnets, said magnets being axially displaced in relation to each other.

17. The wave power assembly according to claim 9, wherein each of said winding slots forms an angle to a plane perpendicular to the direction of motion of said rotor.

18. The wave power assembly according to claim 12, wherein each of said winding slots forms an angle to a plane perpendicular to the direction of motion of said rotor.

19. The wave power assembly according to claim 15, wherein each of said winding slots forms an angle to a plane perpendicular to the direction of motion of said rotor.

20. The wave power assembly according to claim 1, wherein said rotor comprises a permanent magnetic.

21. A wave power plant comprising a plurality of wave power assemblies according to claim 1.

22. The use of a wave power assembly according to claim 1 in order to generate electric energy.

23. A method in order to generate electric energy by means of at least one wave power assembly according to claim 1.

* * * * *